(12) United States Patent
Woehl-Bruhn et al.

(10) Patent No.: US 10,263,500 B2
(45) Date of Patent: Apr. 16, 2019

(54) ELECTRICAL MACHINE INCLUDING A MAGNETIC FLUX WEAKENING APPARATUS

(71) Applicant: Volkswagen Aktiengesellschaft, Wolfsburg (DE)

(72) Inventors: Henning Woehl-Bruhn, Cremlingen (DE); Robert Plikat, Ummern (DE); Eike Hermann Timm, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/859,687

(22) Filed: Jan. 1, 2018

(65) Prior Publication Data

US 2018/0145575 A1 May 24, 2018

Related U.S. Application Data

(63) Continuation of application No. PCT/EP2016/066371, filed on Jul. 8, 2016.

(30) Foreign Application Priority Data

Jul. 9, 2015 (DE) ........................ 10 2015 212 840

(51) Int. Cl.
*H02K 1/27* (2006.01)
*H02K 21/14* (2006.01)
(Continued)

(52) U.S. Cl.
CPC ............... *H02K 21/28* (2013.01); *H02K 1/02* (2013.01); *H02K 1/2766* (2013.01); *H02K 7/125* (2013.01);
(Continued)

(58) Field of Classification Search
CPC .......... H02K 7/12; H02K 7/125; H02K 23/44; H02K 21/021–21/029
(Continued)

(56) References Cited

U.S. PATENT DOCUMENTS

| 6,771,000 B2 | 8/2004 | Kim et al. |
| 2004/0189132 A1* | 9/2004 | Horst ..................... H02K 21/02 310/209 |

(Continued)

FOREIGN PATENT DOCUMENTS

| DE | 3341693 A1 * | 5/1984 | ......... H02K 11/0094 |
| DE | 10 2005 015 657 A1 | 10/2006 | |

(Continued)

OTHER PUBLICATIONS

Machine Translation, Mazzorana, DE 3341693 A1, May 1984.*
(Continued)

*Primary Examiner* — Thomas Truong
(74) *Attorney, Agent, or Firm* — Manfred Beck, P.A.

(57) ABSTRACT

An electric machine includes a rotor having a magnetic field generating device for generating a magnetic flux. A flux changing apparatus of the electric machine includes an axially displaceable body that is disposed axially outside the magnetic field generating device for changing a magnetic flux within a gap between the rotor and a stator in dependence upon an axial position of the body relative to the rotor. The flux changing apparatus includes an adjusting device for axially adjusting the axial position of the body relative to the rotor. The adjusting device includes an actuator and an adjusting element. The actuator acts on the body via the adjusting element. The adjusting element engages the body and/or the actuator in such a manner that a rotational
(Continued)

movement of the body can be decoupled from the adjusting element, a housing of the electric machine, the rotor and/or the actuator.

11 Claims, 4 Drawing Sheets

(51) Int. Cl.
| | | |
|---|---|---|
| *H02K 21/28* | (2006.01) | |
| *H02K 21/02* | (2006.01) | |
| *H02K 7/12* | (2006.01) | |
| *H02K 1/02* | (2006.01) | |
| *H02K 21/04* | (2006.01) | |
| *H02K 21/16* | (2006.01) | |
| *H02K 41/03* | (2006.01) | |
| *H02P 25/08* | (2016.01) | |
| *H02K 1/14* | (2006.01) | |

(52) U.S. Cl.
CPC ......... *H02K 21/028* (2013.01); *H02K 21/042* (2013.01); *H02K 21/16* (2013.01); *H02K 41/03* (2013.01); *H02P 25/08* (2013.01); *H02K 1/148* (2013.01); *H02K 21/027* (2013.01)

(58) Field of Classification Search
USPC .................................. 310/114, 190, 191, 209
See application file for complete search history.

(56) References Cited

U.S. PATENT DOCUMENTS

| | | | |
|---|---|---|---|
| 2007/0018524 A1 | 1/2007 | Yonemori et al. | |
| 2007/0241628 A1 | 10/2007 | Himmelmann et al. | |
| 2008/0036322 A1 | 2/2008 | Franke | |
| 2009/0026864 A1* | 1/2009 | Ichiyama | H02K 21/028 310/154.28 |
| 2009/0045691 A1* | 2/2009 | Ichiyama | H02K 1/274 310/181 |
| 2009/0045765 A1* | 2/2009 | Ichiyama | H02K 11/048 318/538 |
| 2010/0164422 A1 | 7/2010 | Shu et al. | |
| 2013/0187504 A1* | 7/2013 | Tanaka | H02K 21/028 310/156.01 |
| 2014/0312730 A1* | 10/2014 | Shibata | H02K 21/029 310/191 |

FOREIGN PATENT DOCUMENTS

| | | |
|---|---|---|
| DE | 10 2009 060 199 A1 | 8/2010 |
| DE | 10 2010 049 178 A1 | 5/2011 |
| JP | H07-236259 A | 9/1995 |
| JP | 2002-136012 A | 5/2002 |
| JP | 2003-244874 A | 8/2003 |
| JP | 2006-246662 A | 9/2006 |
| JP | 2007-221881 A | 8/2007 |

OTHER PUBLICATIONS

Search Report including Provisional Assessment of Patentability issued by the German Patent and Trademark Office for German Patent Application No. DE 10 2016 112 618.7, dated Apr. 20, 2017.
Search Report including Provisional Assessment of Patentability issued by the German Patent and Trademark Office for German Patent Application No. DE 10 2015 212 840.7, dated May 18, 2016.
International Search Report for International Application No. PCT/EP2016/066371 and translation thereof, dated Oct. 4, 2016.
International Preliminary Report on Patentability for International Application No. PCT/EP2016/066371 including Written Opinion of the International Searching Authority and translation thereof, dated Jan. 9, 2018.

* cited by examiner

ELECTRICAL MACHINE INCLUDING A MAGNETIC FLUX WEAKENING APPARATUS

CROSS-REFERENCE TO RELATED APPLICATIONS

This application is a continuation, under 35 U.S.C. § 120, of copending International Application No. PCT/EP2016/066371, filed Jul. 8, 2016, which designated the United States; this application also claims the priority, under 35 U.S.C. § 119, of German Patent Application No. DE 10 2015 212 840.7, filed Jul. 9, 2015; the prior applications are herewith incorporated by reference in their entirety.

BACKGROUND OF THE INVENTION

Field of the Invention

The invention relates to an electric machine having a flux changing apparatus so as to delimit induced voltages.

During the operation of a conventional electric machine (such as for example a synchronous machine) that has a variable rotational speed, it is possible by means of an inverter maximum voltage to delimit the available supply voltage. Vehicles having an electric motor generally include for example a direct voltage energy storage device and electrical systems with the result that in this case a maximum voltage that can be applied to the terminals of the machine is fixed. The inverter maximum voltage and the maximum phase current can determine the choice of components of the inverter and also its costs. Depending upon the required torque/rotational speed characteristic, it is possible to provide limit ranges with a constant maximum torque and also with a constant maximum power. If the drive is supplied with energy from such a direct voltage source, the admissible maximum direct current can thus also define the maximum power that this direct voltage source can provide. So as to make good use of the entire drive system, it would appear desirable to be able to operate the drive at this maximum power over wide parts of the rotational speed range.

In the case of a synchronous machine that is excited by a permanent magnet, the induced voltage of the machine, in other words the voltage that is induced in the conductors of the stator, changes as the rotational speed increases and the exciter flux remains constant (in simplified terms, the magnetic flux that acts from the rotor on the stator winding). If the maximum stator voltage is achieved, the rotational speed can only be further increased in the presence of a constant power if the magnetic flux that is influencing the induced voltage is reduced accordingly in a gap between the rotor and the stator.

Electric machines are not ideal energy convertors. Losses in the winding or in a conductor of the stator and in materials that carry the magnetic flux can form main loss paths. Particularly when a battery is being used to supply the power (electric and hybrid vehicles), it is important for the electric machine to be highly efficient since during the operation of the vehicle it is not only the use of energy that is influenced but rather also the maximum travel range and the system costs of the drive using an energy storage device (battery) are influenced significantly by this efficiency.

In the case of conventional electric machines that are excited by permanent magnets, it is known to so-call pre-commutate the stator current so as to counteract the induced voltage at high rotational speeds.

German Patent Application Publication No. DE 10 2010 049 178 A1 discloses an electric machine and a method for controlling a magnetic field strength and/or a flux density of a stator portion of an exciter field. A part region of the rotor is configured as a recess, wherein an insertion element can be moved into the recess, in particular can slide therein.

German Patent Application Publication No. DE 10 2005 015 657 A1 discloses an electric machine and a method for adjusting the field and armature in the case of a permanently-excited electric machine, wherein a rotor that can rotate relative to the stator includes rotor sections that can rotate with respect to one another and each rotor section includes an arrangement of permanent magnets that have polarities that face in an alternating manner in the radially outwards direction. Moreover, an adjusting device is provided so as to rotate the rotor sections with respect to one another, wherein the rotor sections can be oriented in a varying rotationally offset manner. A rotor section can be connected in a rigid manner to the main shaft and the other section can rotate with respect to the main shaft. Moreover, an adjusting device that includes an actuator is provided so as to adjust the rotor sections with respect to one another.

The methods and electric machines disclosed in the prior art have different disadvantages. For example, the method of weakening the field by means of a pre-commutation procedure generates additional losses if operating points are to be achieved with this type of field weakening method. As a result, the mid-range degree of efficiency in the cycle is considerably impaired.

Conventional methods have attempted to minimize these disadvantages by means of a custom-fit coordination of the inverter and the electrical motor but this has not produced satisfactory results in all applications. It is possible by means of designing the motor (in particular the position of the permanent magnets in the rotor) on the one hand to allow approaching low to mid-band rotational speed ranges in the torque-rotational speed characteristic diagram without causing a weakening of the field. On the other hand, it is possible by skillfully choosing the magnetic design of the permanently excited synchronous motor to produce a field weakening effect according to the above principle with a relatively small additional energy contribution if a rotor-inherent reluctance can be used. Nevertheless, a slightly higher current in the cycle also generates considerably more losses in a reproducible manner. The reason for this being the predominantly ohmic loads that determine mainly the degree of efficiency in the electric drive mode wherein the current contributes in a quadratic manner in their calculation.

An electric machine is known from Japanese Patent Application Publication No. JP 2006-246662 A that is configured in such a manner that an inadmissibly high induced voltage is not generated in the case of a high rotational speed. A control disc that can be adjusted at the end face with respect to the rotor is provided so as to influence the magnetic flux. Embodiments are disclosed in which this control disc is coupled either in a non-rotatable manner to the housing or to the rotor.

Further apparatuses for influencing the magnetic main flux (in the gap between the rotor and the stator) are known from US 2007/0018524 A1 and US 2007/0241628 A1. US 2007/0018524 A1 discloses for this purpose a coupling yoke that is arranged in a non-rotatable manner relative to the stator and at the end face engages over the stator end surface and rotor end surface and can be adjusted in an axial manner with respect to these end surfaces. US 2007/0241628 A1 discloses an apparatus in which the magnetic main flux can be changed by adjusting the immersion depth of a rotor cylinder in a stator pot.

The conventional methods and apparatuses are inflexible, elaborate and complicated to produce and as a result are extremely costly. In particular, special measures are required for constructing the rotors.

SUMMARY OF THE INVENTION

It is accordingly an object of the invention to propose an electric machine that reduces at least some of the above-mentioned problems. In particular, it is an object of the invention to propose an electric machine that, particularly in a high rotational speed range, can be operated in a reliable and safe manner and that renders it possible in a simple manner to weaken the flux in a high rotational speed range.

With the foregoing and other objects in view there is provided, in accordance with the invention, an electric machine including:

a housing;

a stator fixed with respect to the housing;

a rotor having a magnetic field generating device for generating a magnetic flux, wherein the rotor is disposed to be coaxially rotatable relative to the stator and wherein a gap is formed between the stator and the rotor;

a flux changing apparatus including a body, the body being displaceable in an axial manner relative to the rotor and being disposed axially outside the magnetic field generating device so as to change a magnetic flux within the gap in dependence upon an axial position of the body relative to the rotor;

the flux changing apparatus including an adjusting device for axially adjusting the axial position of the body relative to the rotor;

the adjusting device including an actuator and an adjusting element; and the actuator acting on the body via the adjusting element and the adjusting element engaging with the body and/or the actuator in such a manner that a rotational movement of the body is decouplable from the adjusting element, the housing, the rotor and/or the actuator.

In other words, the object is achieved by an electric machine that includes:

a stator that is fixed to a housing;

a rotor having a magnetic field generating device for generating a magnetic flux, wherein the rotor is arranged in such a manner as to be able to rotate in a coaxial manner relative to the stator and wherein a gap is provided between the stator and the rotor; and a flux changing apparatus that includes a body that can be adjusted in an axial manner relative to the rotor and is arranged axially outside the magnetic field generating device so as to change a magnetic flux within the gap in dependence upon an axial position of the body relative to the rotor. The flux changing apparatus includes an adjusting device for axially adjusting the axial position of the body relative to the rotor. The adjusting device can include an actuator that acts on the body via an adjusting element (final control element), in particular a linkage, wherein the adjusting element engages with the body and/or the actuator, in particular by means of a rotary bearing, in such a manner that a rotational movement of the body can be decoupled from the adjusting element, from the housing, from the rotor and/or from the actuator.

The electric machine is configured so as to perform a method for weakening the magnetic flux during specific operating conditions of the electric machine. The electric machine can be in particular a synchronous machine.

The stator can be embodied as a single part or as a multi-part in an annular shape and can be include a ferromagnetic material, for example thin layers of stator metal sheets (stator laminations) that are electrically insulated relative to one another. The stator can also be produced from other materials such as for example from a compressed magnetic powder material. Reference is therefore also made below to the stator stack. It is possible to place conductors around the stator, wherein multiple groups of conductors can be provided. The number of conductors in each group can correspond to a number of desired electrical phases. A further embodiment of the stator can include air coils. In this case, only the back (yoke) of the stator is produced from a ferromagnetic material or a ferromagnetic material is not used but rather diamagnetic or paramagnetic materials or a gas or air are used.

The rotor can be mounted in such a manner as to be able to rotate relative to the stator and to rotate about an axial direction. The magnetic field generating device can include for example one or multiple permanent magnets and/or one or multiple electric magnets. The magnetic field generating device can include for example multiple permanent magnets that are arranged adjacent to one another spaced apart in the circumferential direction or also in a star-shaped manner and alternating in their north pole-south pole orientation. The magnetic flux in the gap between the stator and the rotor can be directed essentially in the radial direction.

The flux changing apparatus can include multiple parts of which at least one is the body that is arranged completely axially outside the magnetic field generating device. Consequently, it is not necessary to make any structural changes in the section of the rotor that is provided for mounting the magnetic field generating device. It is thus possible to use conventional constructions for mountings for the magnetic field generating devices. However, the rotor can be shorter in the axial direction in comparison to a conventional rotor.

The body can be displaced or moved in particular in an axial manner and can thus divert a portion of the magnetic flux in dependence upon its axial position, in particular guide the magnetic flux through the body, in particular into the body and back out of the body. Consequently, the magnetic flux can also be changed in particular weakened within the gap between the rotor and stator if the body is moved toward an end surface of the rotor or is positioned in the vicinity of the end surface of the rotor, in particular lies essentially against the end surface.

The linkage can be guided for example (at least in sections) through a hollow shaft of the rotor. In different embodiments, the adjusting element can engage around a part of a rotor shaft. Consequently, it is possible to displace the body in the axial direction in a simple manner.

A further embodiment can connect an adjusting device on the rotor (for example fixedly to the rotor with the result that it moves synchronously with the rotor), the adjusting device would then no longer have a decoupling from the rotational movement.

The actuator can include an electrical and/or a hydraulic actuator.

However, the body can also include a fixed (non-rotatable) coupling to the housing or to the stator. In the case of such an embodiment, the axial displacement of the body can be used so as to weaken the magnetic flux. Eddy currents are however induced in this body as a result of the difference in the rotational speed of the rotor and of the body, which would represent losses for the machine when using the field weakening device. In comparison to an electric machine without or with this type of embodiment, two points are of importance: the loss balance reduces in favor of the machine having a mechanical field weakening device since as a result of distributing the flux of the rotor to the stator and the body, the specific magnetic loading on the material reduces and the material of the body can be optimized to prevent eddy currents occurring. Common methods produce the body by way of example in segments or sections of metal sheets and also use powder materials for this purpose.

A further exemplary embodiment contains a flux changing apparatus where the body is not fixedly coupled to the rotor and stator—the body is also mounted in such a manner that it can freely rotate relative to the rotor and stator (housing). The adjusting device can for this purpose be decoupled from the body via a bearing. This means a freely rotatable body within the electric machine that renders possible different differences in the rotational speeds between the rotor and the stator. These differences occur as a result of external boundary conditions. The closer the body is moved toward the rotor, the greater the magnetic (leakage) flux is that penetrates the body. Should the prevailing difference in the rotational speed be different from zero, eddy currents occur in the body that would accelerate this body is such a manner that this difference in the rotational speed is reduced. Finally, a rotational speed difference is set that creates an equilibrium of losses on the one hand (bearing and ventilation losses and eddy current losses) and also the accelerating power as a result of the force of the feedback effect of the eddy current losses on the field being generated.

A further possible embodiment combines the freely rotating body with the option of coupling it to the rotor. The field weakening apparatus—in other words the body—is moved in this case so tightly against the rotor that a hard coupling of the rotational speeds of the rotor and field weakening apparatus, in other words the body, is produced via a friction-locking (force-locking) element (for example a synchronizing ring or via a friction coupling) or a positive-locking (form-locking) element (for example a claw coupling). This coupling can be purposely produced and also again be released.

Such a position, in which the body is moved tightly against the rotor and in which the body can also be coupled in a manner fixed against relative rotation thereto, can be configured as a preferred position that is assumed in the non-energized (currentless) state or when there is a fault condition in the system or the drive. A maximum field weakening of the main flux occurs in this position (via the increased leakage flux). This renders possible a fail-safe function that can be of great importance in the event of a malfunction. In the case of high rotational speeds and a weakening of the field as a result of the current flow in the stator (pre-commutation), a high voltage is generated by means of the winding of the motor if the stator current fails. This can result in an undesired and in the worst case scenario uncontrolled current and energy flow out of the electric machine into an electrical system that is to be supplied (for example onboard electrical systems of a motor vehicle). This can result in a breakdown and even to human injury as long as the motor is running at high rotational speeds. By virtue of the above mentioned preferred position (coupling the body to the rotor in a mechanical and magnetic manner), the induced voltage is reduced suddenly as a result of the increase in the leakage flux and the associated reduction in the main flux and any possible hazard risk is consequently avoided. The preferred position (fail-safe state) can be set using an actuator that is supplied with energy from an energy storage device that is not dependent upon an electrical system or current, the energy storage device being for example a mechanical spring, a fluid spring or the like.

An opposite control is likewise possible, namely in the manner that in a specific extreme operating state (by way of example in the event of a failure in the primary current supply) an emergency power supply of an electrical energy system is made possible. It is also conceivable in such an event to displace the body as far away as possible from the rotor and where necessary to fix it in the direction of rotation. In such an event, the electric machine can be used as a generator without the induced currents and voltages being reduced by means of the flux changing apparatus.

As a result, a simple construction having a simple mechanism is available to cause a weakening of the magnetic flux within the gap. Particularly in such rotational speeds that are above a threshold value. Consequently, it is possible to operate the electric machine in a reliable manner at rotational speeds that are higher than the threshold value without a voltage above the limit voltage being induced in the stator (in particular in the conductors of the stator) and without the risk of damaging the components of the electric machine.

The body can be displaced toward an axial end face of the rotor and can be pushed or displaced in particular as far in the axial direction until it lies essentially against the end face of the rotor. It is possible to achieve a maximum weakening of the magnetic flux in this position. It is possible in this state to produce a magnetic short circuit (introduction of magnetic flux lines within the body) at least of a part of the magnetic flux components (that extend in particular in a transverse manner relative to the radial direction) of the rotor from the axial end face of the rotor. It is consequently possible to weaken the field. The leakage magnetic flux components can be prevented at least in part from integrating with components of the stator so as thus to prevent leakage losses.

The body can include a material having a lower magnetic resistance than air so as to achieve an effective deflection of the magnetic flux lines. When the body is being displaced toward the axial end face of the rotor, the material of the body can be magnetized to saturation at least in a part region of the body. The material of the body (and also the geometry of the body and the distribution of material within the body) can thus be customized to suit the individual rotor, in particular to suit the individual distribution of the magnetic flux that is generated by the magnetic field generating device, so as to achieve a high in particular maximum achievable weakening of the magnetic flux and/or leakage loss reduction that can also be metered in a precise manner.

Figure 5:
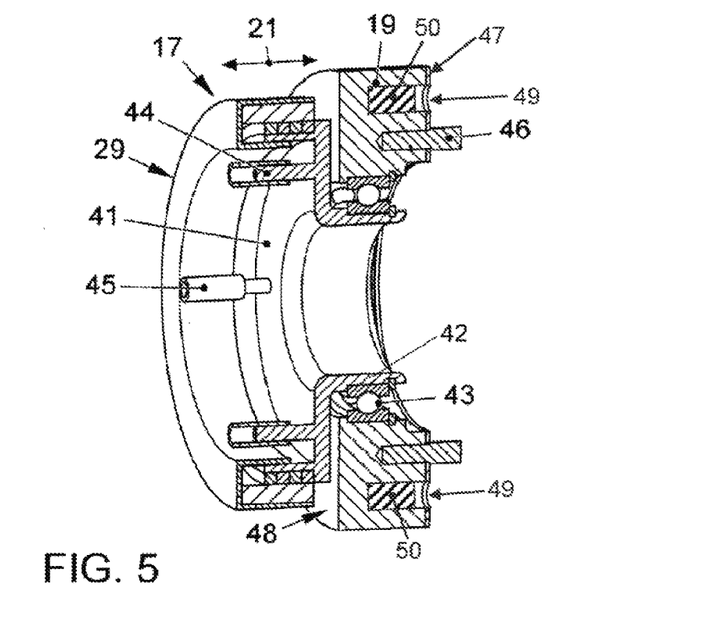
FIG. 5 is a perspective partial sectional view of the adjusting mechanism shown in FIG. 4 in accordance with the invention.

The body can be provided with a structuring (profiling, surface topology, which deviates from a planar arrangement, recesses, ridges etc.) on an end face that is facing the rotor and/or a material can be distributed (in particular within a radial plane) in such a manner as to suit the distribution or configuration of the magnetic field generating device, such as for example an arrangement and/or orientation and/or distribution of individual permanent magnets, of the rotor or to correspond thereto. FIG. 5 schematically illustrates a structuring in the form of recesses 49 in the end face 25 of the body 19. The hatching 50 in FIG. 5 schematically illustrates that the body 19 can be formed of different materials or can have portions with respective different magnetic characteristics. It is possible in particular to configure the structuring and/or the material distribution of the rotor in dependence upon the magnetic flux that is generated by the magnetic field generating device on the axial end face of the rotor. The geometry and the material composition or distribution of the body of the flux changing apparatus can be customized to suit the geometry, arrangement or configuration and intensity of the magnetic flux that is generated by the magnetic field generating device of the rotor. It is consequently possible to achieve a targeted and improved field weakening or flux weakening and moreover to reduce the leakage losses.

An outer radial extension (for example the outermost lying—maximum—radial position) of the body can be essentially equal to an outer radial extension of the rotor but it can also be smaller and greater. Moreover, the body can overlap radially with a radial extension region of the magnetic field generating device of the rotor. The term "radial extension region of the magnetic field generating device" can be understood for example to mean a radial region between a minimum radial position and a maximum radial position of the magnetic field generating device. It is possible as a result of the radial overlapping arrangement to influence the magnetic flux lines that are generated by the magnetic field generating device over an entire (radial) region of the magnetic field generating device. It is consequently possible in a targeted manner to control the extent to which the magnetic flux is weakened or influenced.

The body can include a ferromagnetic material which can be distributed for example in a uniform manner or also can be distributed in a differently compacted manner over an extension region of the body. The body may also include recesses, indentations and/or ridges. The body may be configured in specific embodiments in part at least as a planar plate or disc that can be produced in a simple manner. The body can be composed of different materials, or parts of the body can have different magnetic characteristics as a result of a corresponding treatment (laser treatment, localized heat treatment) in their characteristics despite where applicable uniform materials.

In another embodiment, the adjusting element can be displaced in a non-rotatable but axially displaceable manner relative to the housing and can be configured as a bearing sleeve that is arranged in a concentric manner relative to the rotor axis and receives the body in a rotatable manner. This solution renders it possible for the body to be received in a stable and neatly centered manner which can ensure both the axial adjustability and also the ability to rotate freely on a bearing sleeve. So as to reduce the friction between the bearing sleeve and the body, it is possible to arrange the body via by way of example a roller bearing on the bearing sleeve with the result that it is ensured that it can freely rotate. In other embodiments, correspondingly suitable slide bushes or other slide bearings are also conceivable.

The body can be coupled in a positive-locking (form-locking) and/or friction-locking (force-locking) manner to the rotatable rotor or to the housing (as desired but also in an alternating manner) in the circumferential direction.

According to a feature of the invention, the body is coupled to the rotor and/or to the housing via at least one of the following coupling elements: complementary guiding profiles, coupling pieces that connect the body to the rotor and/or to the housing, complementary friction/adhering surfaces.

It is possible to use in particular respective (for example complementary) guiding profiles that engage with one another to produce the coupling arrangement. For example, the rotor or the body can include a guiding recess and the body or the rotor can include a guiding ridge, wherein a guiding recess and a guiding ridge—where applicable as complementary profiles—can engage with on another so as to couple the rotational movement of the rotor to that of the body.

In other embodiments, it is however possible in lieu of complementary guiding profiles to also provide dedicated coupling pieces that connect the body to the rotor or to the housing. It is possible by way of example to provide for this purpose centering pins that connect the body, which is use as the field weakening element, to the rotor components, wherein these pins are fixedly anchored in the rotor region and the body is entrained in a displaceable manner by one or multiple pins.

In lieu of the guiding profiles or the above described centering pins, it is also possible to provide friction pairings by means of which the end faces of the rotor and the body that face one another can be coupled to one another. The advantage of friction pairings resides in the fact that any possible rotational speed differences that occur as the body is moved toward the rotor end surface can be gradually reduced by means of the friction that occurs and finally the differences can be completely removed. It is possible to avoid loadings that are caused by impacts and shocks as in case of elements that are coupled in a positive-locking manner.

The electric machine can moreover include a further flux changing apparatus for another (opposite lying) axial end face (that is axially spaced apart from the end face of the rotor) of the rotor. It is consequently possible to achieve a further weakening of the magnetic flux or change to the magnetic flux. The electric machine can thus be operated at possibly even higher rotational speeds than would be possible with only one flux changing apparatus.

The voltage that is induced in the conductors of the stator in the case of high rotational speeds can be counteracted by pre-commutating the stator current. It is possible during the pre-commutating procedure to set a current in the direction of the negative d-axis in addition to the (stator) current in the q-axis (in a rotor-fixed d-q coordinate system). The resulting current indicator (in components d and q) is thus pivoted in the direction of movement and leads ahead of the q-axis. The d-component of the current physically causes a weakening of the resulting fields or of the magnetic flux. The method can be used both by electric traction machines (electric and hybrid vehicles) and in the automobile for small auxiliary drives (for example fans, pumps etc.).

The stator of the electric machine can include conductors (a group of conductors or multiple groups of conductors, wherein each group includes a number of conductors that corresponds to the number of desired electrical phases), the conductors being placed (or wound) in stator grooves), wherein the electric machine can moreover include a stator controller that is configured so as to control a current through the conductors in such a manner that the magnetic flux within the gap is weakened. It is consequently possible to provide an additional pre-commutation of the stator current so as for example in addition to set a current in the direction of a negative d-axis of the rotor-fixed coordinate system of the machine.

It is possible so as to weaken the magnetic flux in the gap between the stator and the rotor to combine the method for displacing the body in an axial direction with the method for pre-commutating the current so as to achieve moreover an effective weakening of the magnetic flux.

Embodiments of the invention are explained with reference to the attached drawings. The invention is not limited to the illustrated or described embodiments. The drawings do not explicitly illustrate by way of example a stator-rotor arrangement in which the gap between the stator and rotor is not arranged in a radial manner relative to the rotor axis but rather is arranged in an axial manner with respect thereto. In the case of these electric machines, the body of the adjusting device would likewise be installed in such a manner as to be able to be displaced in the axial direction but would act on an inner or outer peripheral surface of the rotor. These are systemically equivalent to the end faces of a machine that includes a radial gap. The body would in this case render it possible to weaken the rotor-side magnetic field by means of a flux that is exiting radially out of the rotor.

Although the invention is illustrated and described herein as embodied in an electrical machine including a magnetic flux weakening apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Embodiments of the invention render it possible to reduce the exciter flux of an electric machine by means of influencing the magnetic resistances (in particular the magnetic resistances in the spatial regions of the magnetic flux leakage). A magnetic flux leakage can describe the portion of the magnetic flux of the electric machine that extends over parts of the machine that by means of interaction does not act in a force or torque producing manner. In contrast, a magnetic exciter flux describes the magnetic flux portion that contributes as a result of Lorentz forces directly in part to the force or torque of the electric machine.

Figure 1:
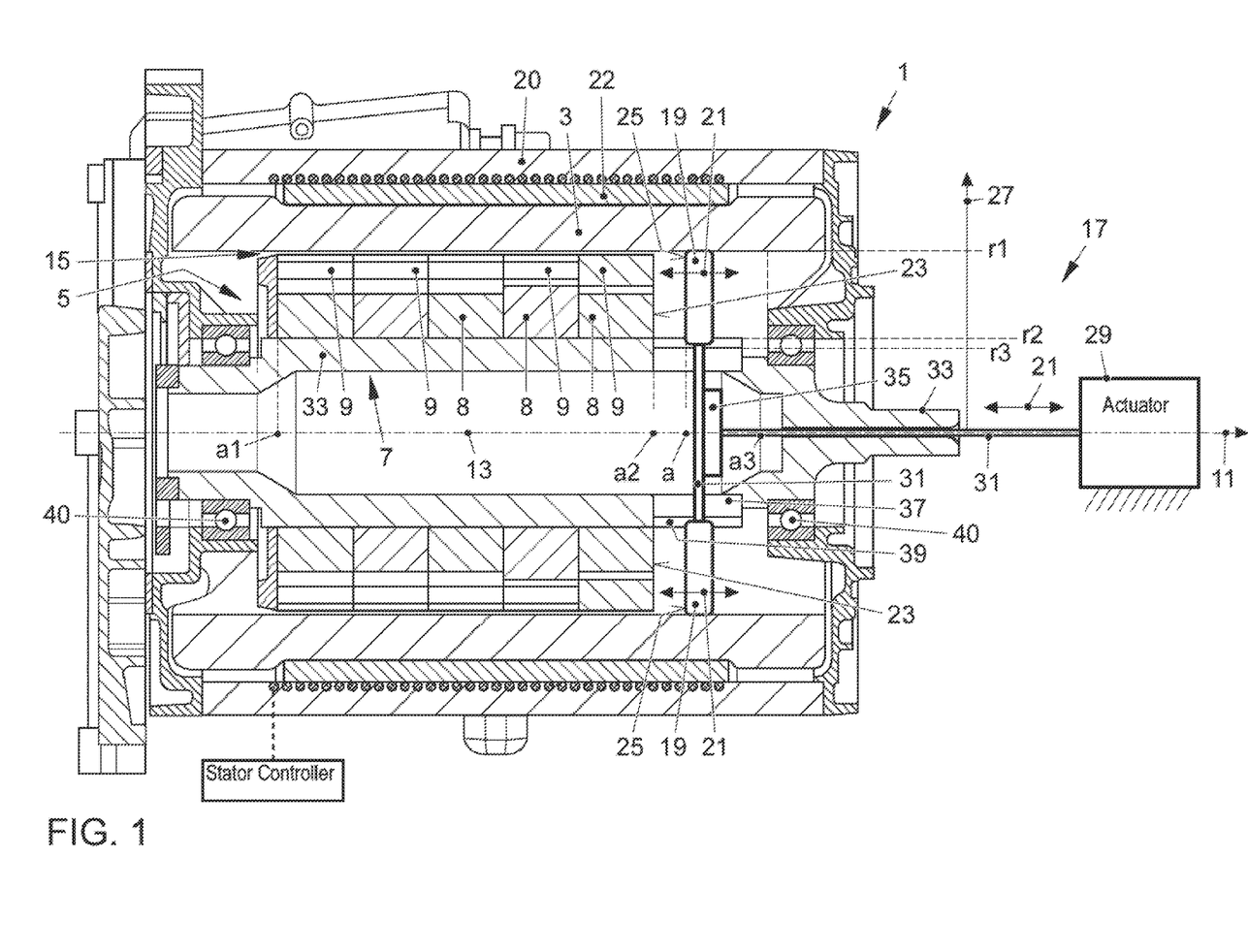
FIG. 1 is a diagrammatic cross-sectional view of an electric machine in accordance with an embodiment of the invention.

The electric machine 1 illustrated in FIG. 1 in a longitudinal sectional view includes a stator 3 that includes conductors that are not illustrated in detail and are arranged around the stator 3, in particular the conductors are arranged in grooves between teeth of the stator 3. The electric machine 1 that is configured in particular as a synchronous machine also includes a rotor 5 that includes a magnetic field generating device 7 that includes a rotor stack 8 and a plurality of permanent magnets 9. The rotor stack can be configured in a similar manner to the stator stack from (e.g. ferromagnetic) metal sheets or from a different material, for example a compressed magnetic powder material. The rotor stack is fixedly connected to the rotor shaft. The rotor 5 can rotate relative to the stator about a rotor axis (axis of rotation) 13, which extends in an axial direction 11, wherein a gap 15 is formed between the stator 3 and the rotor 5, in particular the magnetic field generating device 7. The rotor 5 can be mounted by means of illustrated bearings 40. In addition, a housing 20 and also a cooling jacket 22 are provided.

The electric machine 1 also includes a flux changing apparatus 17 that is configured from multiple components and includes a body 19 that is coupled in a manner fixed against relative rotation to the rotor 5 and can be adjusted in an axial manner relative to the rotor and is arranged axially outside the magnetic field generating device 7 so as to change a magnetic flux within the gap 15 in dependence upon an axial position of the body (indicated by arrows 21) relative to the rotor 5. The axial position of the body 19 can be defined by means of an axial position (denoted by reference character a) of a surface 25 of the body that is facing the rotor 5. A further embodiment of the flux changing apparatus is conceivable in which this is not fixedly connected to the rotor but rather to the stator and lies axially outside the magnetic field generating device 7 likewise in such a manner as to be axially adjustable relative to the rotor.

The magnetic field generating device 7 extends in the axial direction from the axial position a1 as far as the axial position a2. The body 19 can be displaced in an axial region a2 to a3, wherein the axial region from a2 to a3 lies outside the axial region between a1 and a2 which is occupied by the magnetic field generating device 7. Consequently, the body 19 is arranged in all the adjustment positions axially outside the region in which the magnetic field generating device is arranged.

The body 19 can be displaced or moved toward an axial end face or end surface 23 of the rotor 5, in particular to such an extent that an end face or end surface 25 of the body 19 that is facing the axial end face 23 comes to lie against the axial end face 23 of the rotor 5. The axial end face 23 of the rotor or of the magnetic field generating device 7 and also the axial end face 25 of the body 19 can each be planar surfaces.

In different embodiments, the body 19 can be structured on at least its end-face surface 25, in particular the body can include ridges (protrusions) and/or grooves (depressions). This structuring can be provided according to a distribution of magnetic flux lines or permanent magnets that are generated by the magnetic flux generating device 7 or, respectively, are provided in the magnetic field generating device 7. The end-face surface of the rotor can likewise also be provided with a similar type of structuring.

A radial direction is indicated by the arrow with the reference numeral 27. An outer radial extension r1 of the body 19 is essentially similar to an outer radial extension r1 of the rotor 5. A radial extension region between r1 and r2 of the magnetic field generating device 7 overlaps with a radial extension region between r3 and r1 of the body 19. An effective weakening of the magnetic flux is consequently achieved if the body is displaced toward the end face 23 of the rotor 5.

It is possible in particular when the electric machine 1 is being operated at rotational speeds above a threshold value to displace the body 19 toward the end face 23 of the rotor 5. So as to adjust the axial position (denoted by reference character a) of the end-face surface 25 of the body 19, the flux changing apparatus 17 includes an actuator 29 that can be configured for example as a hydraulic actuator or an electric actuator. The actuator 29 in the illustrated embodiment includes a linkage 31 that is guided in a section through a hollow shaft 33 of the rotor 5. One end of the linkage 31 is connected to the actuator 29 which is fixed relative to the stator 3 and another end is coupled to a decoupling element 35, for example a slide bearing or roller bearing that decouples a rotational movement of the body 19 from the actuator 29 or the linkage 31.

A groove 37 is provided so as to guide through radial elements of the linkage 31 in an inner region of the stator 3. It is possible to provide guiding profiles 39 for guiding the body 19 (by means of the rotor 5) that can be produced in particular as a plate or disc from a ferromagnetic material. In particular, the plate 19 or the linkage 31 can mesh in a radial, but axially displaceable manner with elements of the rotor 5. During operation, the body 19 rotates synchronously with the rotor 5.

Embodiments of the invention result in the magnetic flux that is generated by the permanent magnets 9 being deflected in parts of the electric machine, the deflection being dependent upon the axial position of the body 19 and the parts no longer corresponding to the exciter path. As a result, the torque can reduce but also the induced voltage that is induced in the conductors of the stator 3 can be reduced (whilst the rotational speed is constant). Consequently, the torque can be achieved over a greater rotational speed range. As a result, it is possible in certain embodiments to omit the procedure of pre-commutating the current, the procedure being encumbered with the disadvantages known from the prior art.

In other embodiments, it is possible to combine displacing the body 19 in the axial direction with the procedure of pre-commutating the current of the conductors of the stator 3.

It is possible to deflect the flux of the permanent magnets 9 in the rotor 5 (for example within the body 19) by means of filling the air paths of the flux leakage with materials that have a low magnetic resistance (for example a ferromagnetic material), in particular a magnetic resistance that is lower than the magnetic resistance of air.

The plate 19 or the body 19 and the linkage 31 can be produced using different constructions and with different geometries. In accordance with one embodiment, a displacement or adjustment of the body 19 may require adjustment power but not the operation where an adjustment is not performed. As a result, in comparison to the method that involves a pre-commutation of the current, a considerably greater degree of efficiency of the electric machine is possible for the same operating point.

As already mentioned above, the adjustment, in particular an axial displacement or movement of the plate 19, can be superimposed or combined with a known method where the stator currents are pre-commutated. This can be particularly advantageous where high dynamics are required for the drive and if the main flux is only to be changed infrequently or is to be changed in steps. As a result, it is possible to provide an electric machine that has a double adjustment option for the excitation ("double set of excitation—DSE").

Embodiments of the invention can be applied to electrical drives of any type that require a high degree of efficiency. In particular, the electric machine can be used for drives of electric and hybrid vehicles since the system costs can be significantly minimized. In particular, as a result of the increased degree of efficiency of the electric machine, the same travel range is possible using a comparatively small battery. An additional expenditure regarding the electric motor due to the flux changing apparatus 17 can be more than compensated by savings in operating costs, in particular battery costs.

Embodiments, as illustrated for example in FIG. 1, may require or need an energy demand only when there is a change in the exciter field or exciter flux. An energy demand may be required, for example for adjusting the body 19 by means of the actuator 29. Following a successful adjustment of the exciter flux by means of suitably positioning the body 19, however, a field weakening or magnetic flux weakening can be performed without power. A combination with a conventional method of a "pre-commutation of the current" may be possible without additional expenditure. The electric machine 1 requires little constructive outlay in order to implement the method. Furthermore, a high degree of efficiency of the drive can be provided.

Figure 2:
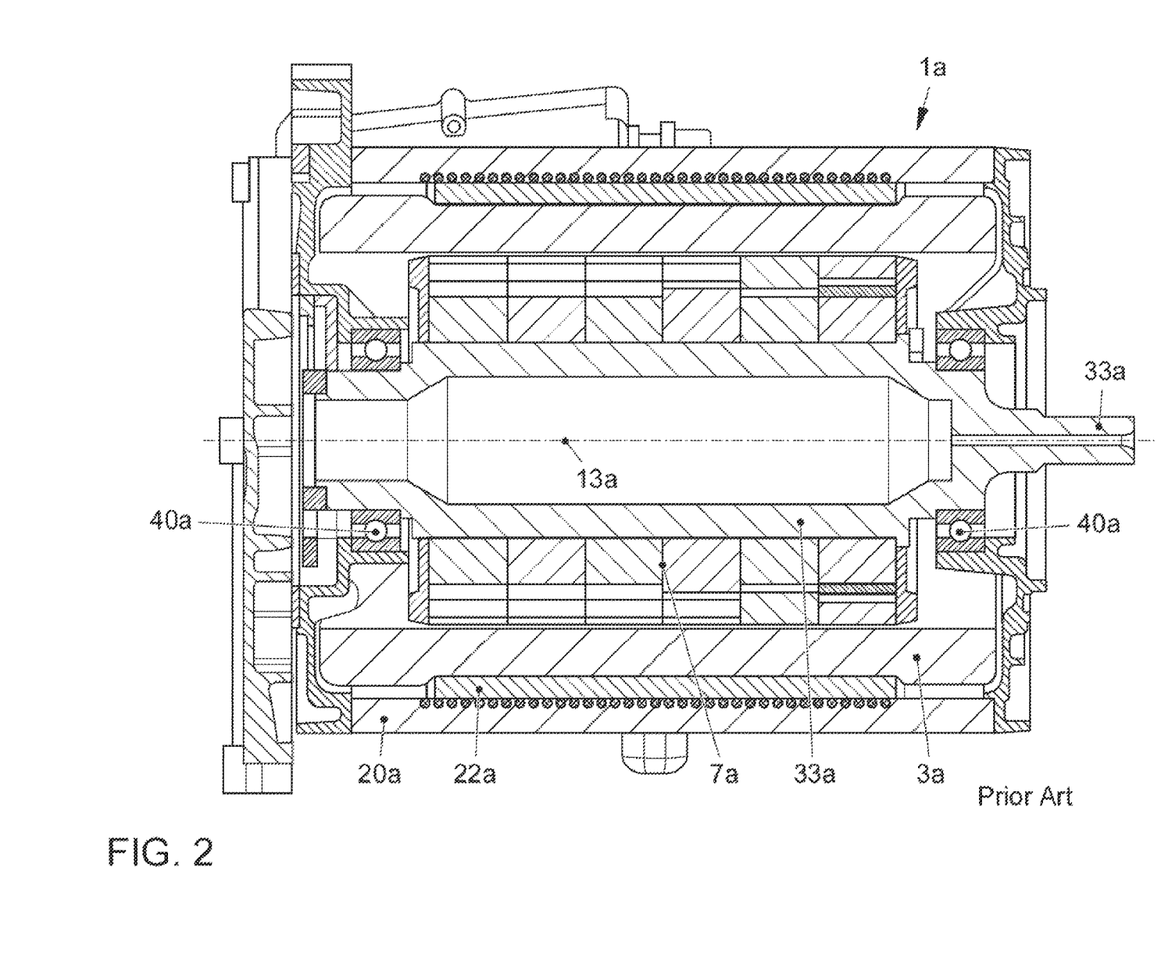
FIG. 2 is a diagrammatic cross-sectional view of an electric machine in accordance with the prior art.

FIG. 2 illustrates a schematic longitudinal section view of an electric machine 1a in accordance with the prior art. Similar or identical elements in FIGS. 1 and 2 are designated by the same reference numbers, wherein the letter "a" has been added to the corresponding reference numerals in FIG. 2. In comparison to the electric machine 1a in accordance with the prior art, which is illustrated schematically in FIG. 2, the rotor stack with magnets 7, 9 of the rotor 5 in accordance with an embodiment of the invention, which is illustrated in FIG. 1, has been shortened, and the slidable plate 19 is integrated in the installation space thus obtained. By means of axially moving this plate 19 or this body 19 it is possible to influence the leakage flux of the rotor 5 via the air-filled space, and in particular beyond the end-face surface 23 of the rotor 5. If the plate 19 is moved toward the rotor 5, or in particular toward its end-face surface 23, a portion of the flux generated by the permanent magnets 9 is closed over the plate and no longer available for the excitation of the electric machine. As a result, the exciter field is weakened. The plate 19 can be connected radially to the rotor 5 via the guide grooves 39 such that the axial movement is made possible by guiding the plate within limits, in particular within the limits between a2 and a3 in the axial direction, radial movement relative to the rotor 5 is however avoided. It is possible by virtue of rotating the plate 19 together with the rotor 5 to largely avoid eddy currents since there is no relative speed between the plate and the rotor stack with the magnets 7, 9. The plate 19 or the body 19 thus rotates synchronously with the rotor 5.

A simplified embodiment of the invention could also provide a configuration where the plate is fixed relative to the housing. This solution, however, would mean less efficiency, but this could be counteracted by the use of suitable materials (for example a soft magnetic compound).

The axial adjustment of the body 19 or the plate 19 is performed via the actuator 29 that can be configured, for example, as an electric or hydraulic linear drive. In particular, the adjustment can be performed via the linkage 31. This linkage 31 should perform a decoupling of the rotational movement of the rotor 5 to the fixed actuator 29 via the decoupling element 35.

The geometry of the body 19 may have a particular configuration or shape. When configured as a planar surface, the leakage flux would rise sharply (non-linear course of the flux via a variable air gap length) only shortly before the plate 19 comes to rest against the rotor 5. Even a simple contour need not in all cases be sufficient, since a mere surface area via which the flux penetrates in the plate must not have any influence in the case of ideal magnetic characteristics of the plate (high magnetic permeability).

In accordance with one embodiment of the invention, the structuring of the plate or the body 19 and the structuring of the rotor opposite side (in other words the structuring of the end-face surface 25 of the body 19 or the structuring of the end-face surface 23 of the rotor) are configured such that parts of the material over which the variable leakage flux flows guide large parts of this flux as the plate approaches and thus go into saturation. Thus, a material distribution or substance distribution is therefore adjusted within the body 19 to a magnetic flux that is generated by means of the permanent magnets 9. One advantage of such a configuration may be in a better control of the leakage flux during the adjustment of the body 19 that can be configured for example as a plate. A control procedure can be, for example, almost proportional to the displacement path of the plate 19 and over as wide a range as possible. This can reduce the outlay required in terms of the accuracy of the mechanical adjustment mechanism and permit greater tolerances in the adjustment system.

Figure 3:
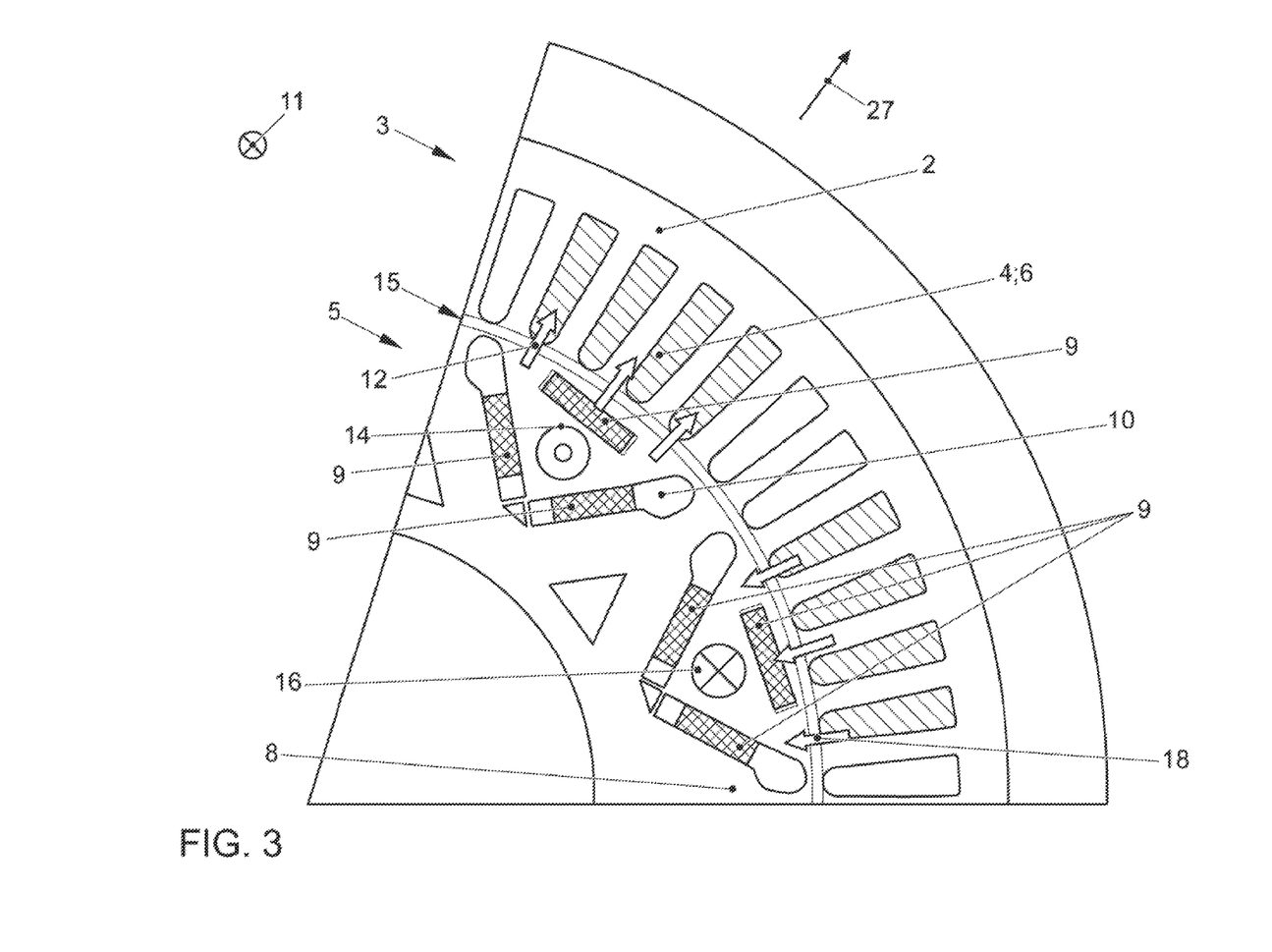
FIG. 3 is a diagrammatic axial view of a part of an electric machine in accordance with an embodiment of the invention.

FIG. 3 illustrates in an axial view of a cross-sectional view of a part of an electric machine in accordance with an embodiment of the invention. For example, the electric machine illustrated in FIG. 1 can be configured as illustrated in part in FIG. 3. The stator 3 includes a stator stack 2 and stator grooves 4 between teeth of the stator stack 2. Conductors 6 are placed in the grooves and during the operation, in other words rotation of the rotor 5 relative to the stator, electrical voltages are induced in the conductors. The rotor 5 includes a rotor stack 8 as well as cavities 10 for the permanent magnets 9, wherein parts of the cavities 10 are filled by the permanent magnets 9. The rotor 5 is in this case configured such that it includes magnets 9 in a radially outer position or layer and magnets 9 in a radially inner position or layer. The reference numeral 12 denotes an exciter field direction which is directed away from the rotor 5 (radial direction).

The reference numeral 14 denotes a leakage field direction (out of the drawing plane, in other words in an axial direction) of the upper pole of a magnet, and the reference numeral 16 denotes a leakage field direction (into the drawing plane, in other words in an axial direction) of the lower pole of a magnet. The reference numeral 18 denotes an exciter field direction which is directed into the rotor (radial direction). The leakage field 14 is thus directed out of the drawing plane and the leakage field 16 is directed into the drawing plane. As the body 19 approaches the end face of the rotor illustrated in FIG. 3, these leakage field lines 14, 16 can be closed via the body 19, so as to thus cause a (at least in part) magnetic short circuit.

In the segment that is illustrated schematically in FIG. 3 as an axial plan view of the stator and rotor stack, the stator grooves 4 are shown for the stator winding 6 and the cavities 10 in the rotor stack for integration of permanent magnets 9. The exciter field 12, 18 that is to be influenced is directed essentially in the radial direction 27 into the gap 15. The magnetic flux necessary for this is generated by two layers of magnets 9, wherein the outer layer is arranged directly in the vicinity of the rotor peripheral surface and the inner layer is arranged deep inside the rotor. By virtue of the body 19 or the plate 19 approaching in the axial direction, the magnetic flux that has previously been guided from the upper pole via the gap 15 is now in part guided out of the drawing plane (reference numeral 14), over the plate 19 (not visible in FIG. 3) so as subsequently to enter back into the lower pole 16 and to close the flow path.

Figure 4:
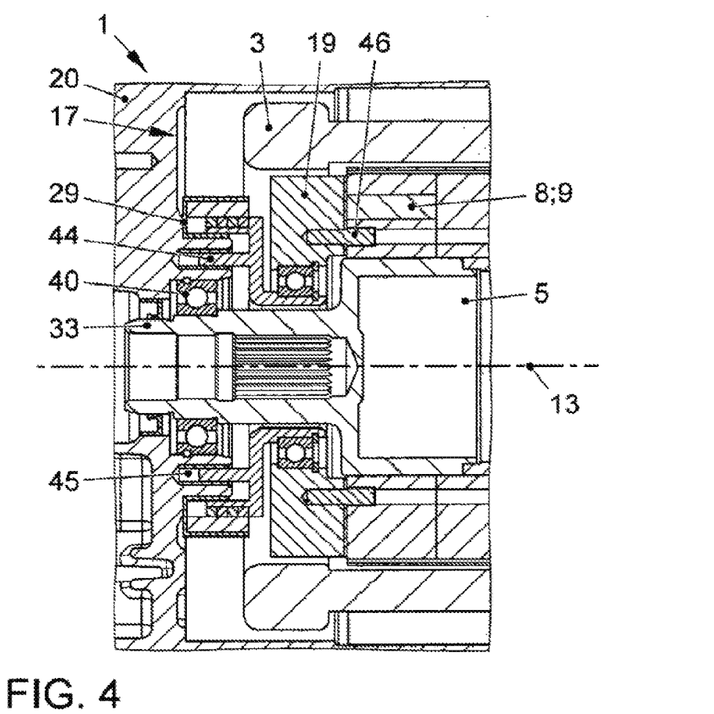
FIG. 4 is a diagrammatic cross-sectional view of an electric machine in accordance with a further embodiment of the invention.

FIG. 4 shows an electric machine 1 in a longitudinal sectional view, in which a stator 3 is arranged in a housing 20, (non-rotatably connected to the housing 20). Furthermore, a rotor shaft 33 is mounted in the housing 20 via a roller bearing 40. Rotor stacks 8 having permanent magnets 9 are arranged on the rotor shaft 33 inside the housing in the region of the stator 3 and jointly with the rotor shaft 33 form the rotor 5 that is rotatable about the rotor axis 13. The flux changing apparatus 17 (see FIG. 5) includes an annular actuator 29 that is connected to the housing 20. The actuator is connected to a bearing sleeve 41 that is used as an adjusting element and is coupled such that the bearing sleeve extends in a concentric manner with respect to the rotor axis 13 and can be adjusted via the actuator 29 axially in the direction 21. The bearing sleeve 41 includes a bearing support 42 and the body 19 is freely rotatably mounted on the bearing support via a roller bearing 43.

The bearing sleeve 41 is centered and guided via guide pins 44 that are received by the sleeves 45 that are arranged in the housing 20. In the illustration of FIG. 4 and FIG. 5, optional centering pins 46 are provided, which are used to couple the body 19 to the rotor 5 in a manner fixed against relative rotation. The body, however, is received in a linear displaceable manner on the centering pins 46 that are firmly anchored in the rotor, so that the body can be moved backward and forward if the actuator is operated in the direction of 21.

In another embodiment, centering pins 46 are not provided, so that the body 19 is arranged in a freely rotatable manner, in other words without being coupled to the rotor, to the housing or to the stator on the bearing sleeve 41 or the roller bearing 43 in the end region of the rotor.

In another embodiment, the rotor 5 or the rotor stack 8 includes a friction surface on its end face and the body 19 includes a friction surface 47 on its end face, and the friction surfaces engage with one another during the corresponding axial displacement of the body 19 in the direction of the rotor 5, with the result that a speed difference between the body 19 and the rotor 5 is reduced and the body moves at the same rotational speed as the rotor.

In another embodiment, an alternative or supplementary friction surface 48 can also be provided on the opposite end face of the body 19 and in case of an axial displacement in the direction 21 away from the rotor 5, the friction surface subsequently engages with a corresponding friction surface on the housing or on a stator assembly and where necessary decelerates the rotating body 19 optionally to a standstill.

The actuating mechanism or actuator 29 is illustrated here as a linear motor. In other embodiments, such linear elements can also be configured with helical, worm or planetary gears. The actuator 29 is to be actuated primarily electrically in this case. Other actuators or driving mechanisms (for example hydraulic, pneumatic, piezoelectric cascades, etc.) are also possible.

In addition to the direct transmission of the linear movement of the actuator 29 to the body 19, the corresponding linear movement may also be converted into a corresponding linear movement via a rotational movement of the actuator (if necessary using a gear ratio), either via an adjusting lever or suitable spindle drives. In the illustration here, the actuator is coupled to the housing, in other embodiments, suitable actuators can also be coupled with the rotor 5 or the rotor shaft, wherein the linear movement can be carried out in direction 21 where necessary via a screw thread.

Alternatively, it is also possible to provide the necessary coupling of the body 19 to the rotor 5 or to the housing 20 via the above described positive-locking (form-locking) coupling elements.

The rotatable mounting of the body 19 on the bearing sleeve 41 and the bearing support 42 via roller bearing 43 may alternatively be carried out via other suitable bearings, in particular slide bearing arrangements.

It is possible in other embodiments to provide another configuration/arrangement/orientation of permanent magnets in the rotor 5. A number of other configurations are conceivable for the rotor. However, sufficient material should be provided (axially) above and below the magnets so as in this manner to be able to achieve a sufficiently large amount of flux in the axial direction.

It is possible to provide for the approximately linear field weakening behavior an axial interlocking (toothing) of the field weakening plate or the body 19 with the rotor stack 8. As an optional exemplary embodiment, a combination of ferromagnetic and non-ferromagnetic materials is also conceivable (for example, steel and aluminum). In this way, in the interlocking configuration, with saturation used in a targeted manner, a largely linear behavior can be generated. The structure may include milling out in an oblique manner the "axial lugs of steel" in the region of the axial interlocking configuration (toothing) and to use aluminum parts to maintain the mechanical strength.

In the case of electric machines that have a relatively large axial length, it is possible to provide a body 19, as shown in FIG. 1, on both end faces of the rotor. This ensures that a very large part of the magnetic flux can escape via the axial path from the respective end faces of the rotor stack and be guided through the respective weakening plate so as to effectively further weaken the exciter field.

Furthermore, the drive or the control of the electric machine may be customized in terms of a control procedure by adapting the control parameters for the available permanent magnet flux and the correction of the skew angle, especially when the field is weakened on one side.

In accordance with another embodiment, a comparatively simple configuration is possible using a standing plate or standing plates (without a relative velocity with respect to the stator). However, at high rotational speeds this version would cause eddy currents in the plate which would manifest itself in considerable hysteresis losses and a significant warming of the plate unless a suitable material is used with few losses.

In a further embodiment, it is possible to use a transmission element (for example, gear wheel, clutch discs, bearings or resolver rotors) as a plate with low magnetic resistance. Other elements that are located in the vicinity of the rotor, may also be used or qualified for this function. This element may be used in lieu of a separate plate so as to integrate the functions of utilizing the available space, avoiding costs and reducing the weight.

There are also embodiments having the following features that can be implemented individually or in any combination:

An electric machine 1 including:
a stator 3;
a rotor 5 having a magnetic field generating device 7 for generating a magnetic flux, wherein the rotor 5 is arranged in such a manner as to be able to rotate in a coaxial manner relative to the stator 3 and wherein a gap 15 is formed between the stator and rotor; and a flux changing apparatus 17 that includes a body 19 that is coupled to the rotor 5 in a manner fixed against relative rotation and can be displaced in an axial manner relative to the rotor 5 and is arranged axially outside the magnetic field generating device 7 so as to change a magnetic flux within the gap 15 in dependence upon an axial position (denoted by reference character a) of the body 19 relative to the rotor 5.

An electric machine wherein the body 5 can be displaced toward an axial end face 23 of the rotor 5 so as to cause a magnetic short circuit at least of some of the leakage magnetic flux components 14, 16 of the rotor 5 on the axial end face 23 of the rotor.

An electric machine wherein the body 19 includes a material that has a lower magnetic resistance than air, wherein as the body 19 is being displaced toward the axial end face 23 of the rotor 5 the material of the body is magnetized to saturation at least in a part region of the body.

An electric machine wherein the body includes a structuring on an end face 25 that faces the rotor 5 and/or a material distribution, wherein the structuring and/or the material distribution is configured in dependence upon the magnetic flux 14, 16 on the axial end face 23 of the rotor 5, the magnetic flux being generated by the magnetic flux generating device 7, wherein the body is embodied in particular from different materials or parts of the body have different magnetic characteristics as a result of a corresponding treatment in their characteristics despite where applicable uniform materials.

An electric machine wherein an outer radial extension r1 of the body 19 is essentially equal to an outer radial extension r1 of the rotor stack 5, wherein the body overlaps with a radial extension region r1, r2 of the magnetic field generating device 7 of the rotor stack 5 in a radial manner.

An electric machine wherein the body 19 includes a ferromagnetic material or a different material that can guide magnetic fluxes.

An electric machine wherein the rotor 5 and the body 19 are coupled to one another in the circumferential direction in a positive-locking manner, in particular have in each case complementary guiding profiles 39 that engage with one another.

An electric machine, wherein the flux changing apparatus 17 includes an adjusting device 29, 31 for axially adjusting the axial position of the body relative to the rotor, wherein the adjusting device includes an actuator 29 that acts on the body via an adjusting element, in particular a linkage 31, wherein the adjusting element engages with the body and/or the actuator, in particular by means of a rotary bearing 35, in such a manner that a rotational movement of the body 19 is decoupled from the adjusting element 31 and/or from the actuator 29.

An electric machine that includes a further flux changing apparatus for a different axial end face of the rotor 5.

An electric machine, wherein the stator 3 includes conductors 6 that are placed around the stator, wherein the electric machine moreover includes a stator controller that is configured so as to control a current through the conductors 6 in such a manner that the magnetic flux within the gap 15 is weakened.

Overall, embodiments of the invention can produce an electric machine that renders possible a high degree of efficiency over a large or entire rotational speed range, which cannot be achieved using the known prior art. It is possible particularly in traction applications that have a limited electrical travel range to achieve, by means of a high degree of efficiency of the drive, a reduction in system costs by reducing the size of the battery.

In principle, embodiments of the invention are transferable for the entire field of electrical engineering to applications that require a high degree of efficiency over a great rotational speed range or a drive that loses a small amount of heat.

LIST OF REFERENCE CHARACTERS 1, 1a Electric machine
2 Stator stack 3, 3a Stator
4 Stator groove
5 Rotor
6 Winding
7, 7a Magnetic field generating device
8 Rotor stack
9 Permanent magnets
10 Rotor cavity
11 Axial direction
12, 18 Exciter field direction
13, 13a Rotor axis
14, 16 Leakage field direction
15 Gap
17 Flux changing apparatus
19 Body
20, 20a Housing
21 Displacement direction
22, 22a Cooling jacket
23 End-face surface of the rotor
25 End-face surface of the body
27 Radial direction
29 Actuator
31 Linkage
33, 33a Rotor shaft
35 Decoupling apparatus
37 Groove
39 Guide for the body
40, 40a Bearing
a1, a2 Axial limits of the rotor stack
a2, a3 Axial limits to which the body can be displaced
a Actual position of the body in the axial direction
r1 Outer radial extension of the body or of the rotor
r1, r2 Radial extension region of the rotor
r1, r3 Radial extension region of the body
41 Bearing sleeve
42 Bearing support
43 Roller bearing
44 Guiding pins
45 Sleeve
46 Centering pins
47 Friction surfaces
48 Friction surfaces

What is claimed is:

1. An electric machine comprising:
   a housing;
   a stator fixed with respect to said housing;
   a rotor having a magnetic field generating device for generating a magnetic flux, wherein said rotor is disposed to be coaxially rotatable relative to said stator and wherein a gap is formed between said stator and said rotor;
   a flux changing apparatus including a body, said body being displaceable in an axial manner relative to said rotor and being disposed axially outside said magnetic field generating device so as to change a magnetic flux within the gap in dependence upon an axial position of said body relative to said rotor;
   said flux changing apparatus including an adjusting device for axially adjusting the axial position of said body relative to said rotor;
   said adjusting device including an actuator and an adjusting element; and
   said actuator acting on said body via said adjusting element and said adjusting element engaging with at least one of said body and said actuator in such a manner that a rotational movement of said body is decouplable from at least one element selected from the group consisting of said adjusting element, said housing, said rotor, and said actuator, wherein said body is displaceable toward an axial end face of said rotor so as to produce a magnetic short circuit at least of a portion of leakage magnetic flux components of said rotor at said axial end face of said rotor, wherein said body has an end face facing said rotor and has a structuring on said end face facing said rotor and wherein said magnetic field generating device generates a magnetic flux on said axial end face of said rotor, said structuring on said end face facing said rotor is adapted to said magnetic field generating device in order to allow a targeted magnetic flux weakening.

2. The electric machine according to claim 1, wherein said body includes a material that has a lower magnetic resistance than air, wherein when said body is being displaced toward said axial end face of said rotor, said material of said body is magnetized to saturation at least in a part region of said body.

3. The electric machine according to claim 1, wherein said body is formed of different materials.

4. The electric machine according to claim 1, wherein portions of said body, due to a corresponding treatment with regard to their characteristics, have respective different magnetic characteristics.

5. The electric machine according to claim 4, wherein said body is formed of a uniform material.

6. The electric machine according to claim 1, wherein:
   said rotor is configured as a rotor stack including said magnetic field generating device, wherein an outer radial extension of said body is substantially equal to an outer radial extension of said rotor stack; and
   said magnetic field generating device has a radial extension region, said body radially overlaps with the radial extension region of said magnetic field generating device of said rotor stack.

7. The electric machine according to claim 1, wherein:
   said adjusting element is configured as a bearing sleeve, said bearing sleeve is fixed against relative rotation with respect to said housing;
   said rotor defines a rotor axis, said bearing sleeve is disposed concentrically to the rotor axis; and
   said bearing sleeve is axially movable, and said bearing sleeve receives said body in a rotatable manner.

8. The electric machine according to claim 1, wherein said body is couplable to said rotor in a circumferential direction thereof in at least one of a positive-locking manner and a friction-locking manner.

9. The electric machine according to claim 8, wherein said body is couplable to at least one of said rotor and said housing via at least one coupling element selected from the group consisting of complementary guiding profiles, coupling pieces connecting said body to at least one of said rotor and said housing, and complementary friction/adhering surfaces.

10. The electric machine according to claim 1, wherein:
    said flux changing apparatus is a first flux changing apparatus for a first axial end face of said rotor; and
    a second flux changing apparatus is provided for a second axial end face of said rotor.

11. The electric machine according to claim 1, further including:
    a stator controller;
    said stator having conductors placed around said stator; and said stator controller being configured to control a current through said conductors in such a manner that the magnetic flux within the gap is weakened.

\* \* \* \* \*